United States Patent
Atherton et al.

(10) Patent No.: US 11,072,071 B2
(45) Date of Patent: Jul. 27, 2021

(54) MODIFYING ROBOT DYNAMICS IN RESPONSE TO HUMAN PRESENCE

(71) Applicant: AUTODESK, INC., San Rafael, CA (US)

(72) Inventors: Evan Atherton, San Carlos, CA (US); David Thomasson, Fairfax, CA (US); Heather Kerrick, Oakland, CA (US); Hui Li, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 240 days.

(21) Appl. No.: 15/709,361

(22) Filed: Sep. 19, 2017

(65) Prior Publication Data
US 2019/0084158 A1    Mar. 21, 2019

(51) Int. Cl.
*B25J 9/16* (2006.01)
*G05B 19/048* (2006.01)
*G05B 19/418* (2006.01)
*G05B 19/042* (2006.01)

(52) U.S. Cl.
CPC .......... *B25J 9/1676* (2013.01); *G05B 19/042* (2013.01); *G05B 19/048* (2013.01); *G05B 19/41885* (2013.01); *G05B 2219/23005* (2013.01); *G05B 2219/40202* (2013.01); *G05B 2219/40323* (2013.01)

(58) Field of Classification Search
CPC .............. B25J 9/1676; G05B 19/048; G05B 19/41885; G05B 2219/40202; G05B 2219/40323; G05B 2219/23005
See application file for complete search history.

(56) References Cited

U.S. PATENT DOCUMENTS

| | | | | |
|---|---|---|---|---|
| 2008/0021597 A1* | 1/2008 | Merte | ..................... | F16P 3/141 700/255 |
| 2008/0161970 A1* | 7/2008 | Adachi | .................. | B25J 9/0003 700/253 |
| 2009/0125145 A1* | 5/2009 | Adachi | .................. | B25J 9/0003 700/250 |
| 2010/0179690 A1* | 7/2010 | Matthias | ................ | B25J 9/1676 700/253 |
| 2011/0050878 A1* | 3/2011 | Wells | ..................... | H04N 7/181 348/86 |
| 2011/0264266 A1* | 10/2011 | Kock | ...................... | B25J 9/1676 700/253 |
| 2014/0067121 A1* | 3/2014 | Brooks | .................. | B25J 9/1676 700/255 |
| 2014/0244037 A1* | 8/2014 | Scott | ...................... | B25J 9/1694 700/253 |
| 2016/0354927 A1* | 12/2016 | Kikkeri | ................... | B25J 9/1676 |
| 2017/0001316 A1* | 1/2017 | Katayama | ................ | B25J 19/06 |
| 2018/0222050 A1* | 8/2018 | Vu | ......................... | G01S 17/026 |

* cited by examiner

*Primary Examiner* — Jason Holloway
(74) *Attorney, Agent, or Firm* — Artegis Law Group, LLP

(57) ABSTRACT

A robot system models the behavior of a user when the user occupies an operating zone associated with a robot. The robot system predicts future behaviors of the user, and then determines whether those predicted behaviors interfere with anticipated behaviors of the robot. When such interference may occur, the robot system generates dynamics adjustments that can be implemented by the robot to avoid such interference. The robot system may also generate dynamics adjustments that can be implemented by the user to avoid such interference.

22 Claims, 12 Drawing Sheets

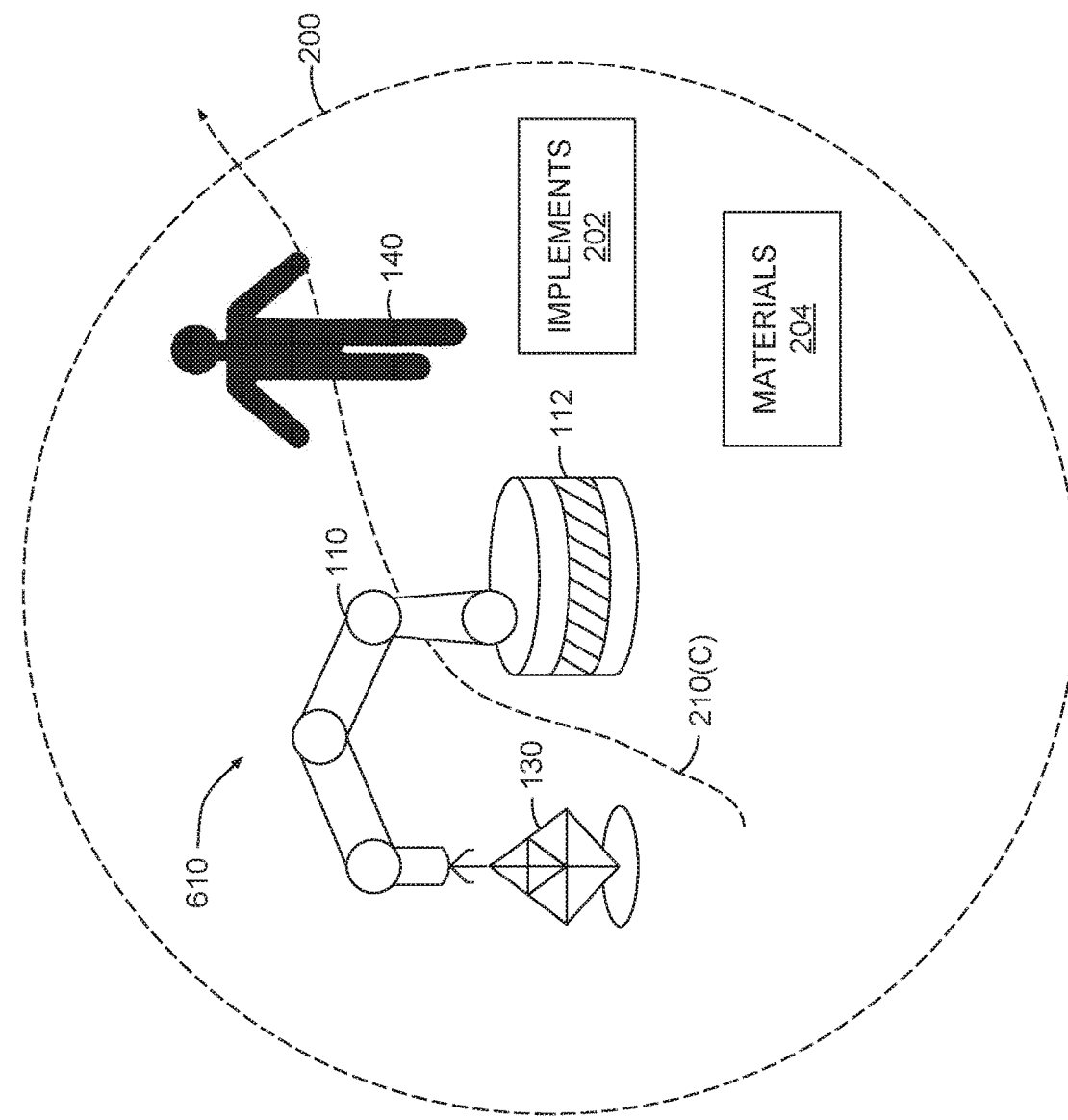

MODIFYING ROBOT DYNAMICS IN RESPONSE TO HUMAN PRESENCE

BACKGROUND OF THE INVENTION

Field of the Invention

Embodiments of the present invention relate generally to robotics and, more specifically, to modifying robot dynamics in response to human presence.

Description of the Related Art

In a conventional manufacturing environment, an industrial robot operates within a three-dimensional (3D) operating zone. The operating zone associated with a given robot is defined by the mechanical limits of the robot and/or the specific actions the robot is programmed to perform. For example, the operating zone associated with a 1-axis drill press robot could be limited to a cylinder that is aligned with the axis and within which the robot is capable of operating. By contrast, the operating zone associated with a 6-axis welding robot could include a sphere that surrounds the robot and defines a 3D area within which the robot is capable of operating.

The operating zones associated with industrial robots are usually unsafe areas for humans to occupy. In particular, industrial robots are oftentimes quite large and can move in rapid and unpredictable manners, potentially causing harm to nearby humans or human operators. Despite these known risks, in industrial settings, humans usually need to enter the operating zones of robots for various reasons. For example, a repair technician may need to enter the operating zone of a robot in order to diagnose and/or fix a problem with the robot. Alternatively, a design engineer may need to enter the operating zone of a robot to inspect a product or part the robot is fabricating. When a human does enter the operating zone of a robot, the robot is typically powered down to allow the human to enter the operating zone. However, this approach suffers from specific drawbacks.

First, the human cannot directly observe the actions of the robot when the robot is powered down. This limitation makes diagnosing problems difficult and also prevents direct observation of how the robot performs various operations. Second, the human cannot interact with the robot in any meaningful way, thereby limiting the degree to which a human can improve, for example, the way a robot performs a given fabrication process.

As the foregoing illustrates, what is needed in the art are more effective techniques for interacting with industrial robots.

SUMMARY OF THE INVENTION

Various embodiments of the present invention set forth a computer-implemented method for controlling a robot, including capturing sensor data related to an operating zone within which the robot performs a fabrication process, generating a dynamic model associated with a user who is residing within the operating zone, predicting a first user action associated with the user based on the dynamic model, and adjusting one or more dynamics of the robot based on the first user action.

At least one advantage of the techniques described herein is that the user may occupy the operating zone associated with the robot with reduced risk.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A-6B illustrate how the control application of FIG. 1 adjusts the configuration of the robot of FIG. 1 in response to the presence of a user, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

As discussed above, in a conventional manufacturing environment, industrial robots operate within specific operating zones that may be dangerous for humans to occupy. For various reasons, humans must enter these zones anyway. In the interest of safety, industrial robots are typically powered down in the presence of humans. However, doing so limits the effectiveness with which humans can interact with those robots.

To address these issues, embodiments of the invention include a robot system configured to detect nearby human users and then adjust the dynamics of a robot based on the predicted behavior of those users. Accordingly, a user may safely enter the operating zone of the robot and interact with the robot.

System Overview

Figure 1:
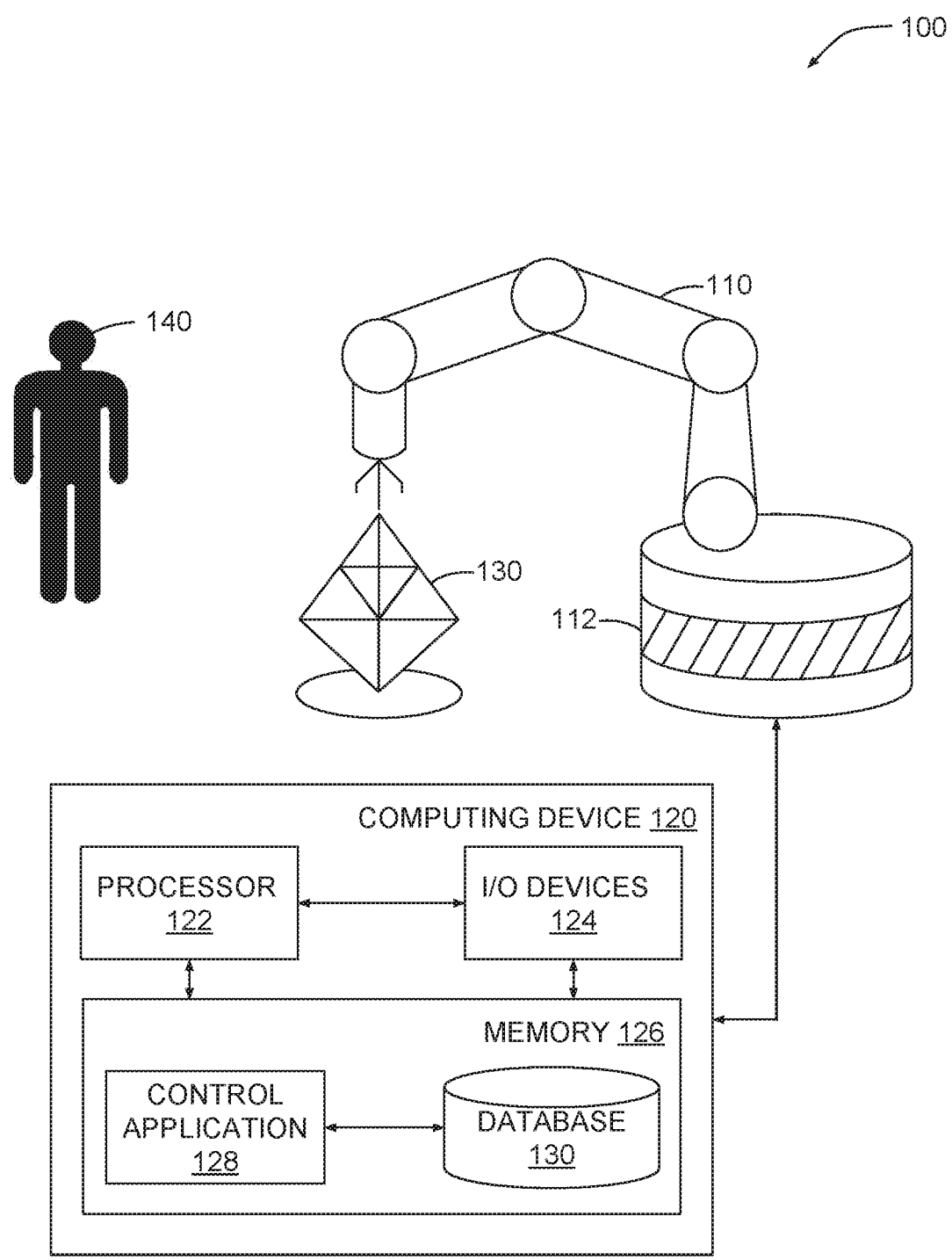
FIG. 1 illustrates a system configured to implement one or more aspects of the present invention.

FIG. 1 illustrates a system configured to implement one or more aspects of the present invention. As shown, a robot system 100 includes a robot 110 coupled to a computing device 120. Robot 110 is configured to fabricate a structure 130 in the presence of a user 140. Structure 130 may be any technically feasible three-dimensional (3D) structure, including an assembly of polygons, among other possibilities.

Robot 110 includes a sensor array 112 configured to capture three-dimensional optical and/or acoustic data related to structure 130, user 140, and/or the environment surrounding robot 110. For example, sensor array 112 could include a set of stereoscopic cameras configured to collect stereoscopic images representing the spatial environment surrounding robot 110. Those images may represent nearby objects such as structure 130 and/or user 140. In addition, sensor array 112 could include a set of acoustic sensors configured to measure the acoustic soundscape surrounding robot 110. That soundscape could include sounds generated via fabrication of structure 130 and/or sounds generated by user 140. The optical and/or acoustic data gathered by sensor array 112 is referred to generally as "audiovisual data."

Computing device 120 collects audiovisual data via sensor array 112 and then adjusts the dynamics of robot 110 based on the presence and predicted behavior of user 140. Computing device 120 includes a processor 122, input/output (I/O) devices 124, and a memory 126. Processor 122 may be any technically feasible form of processing device configured to process data and execute program code. Processor 122 could be, for example, a central processing unit (CPU), a graphics processing unit (GPU), an application-specific integrated circuit (ASIC), a field-programmable gate array (FPGA), any technically feasible combination of such units, and so forth.

I/O devices 124 may include devices configured to receive input, including, for example, a keyboard, a mouse, and so forth. I/O devices 124 may also include devices configured to provide output, including, for example, a display device, a speaker, and so forth. I/O devices 124 may further include devices configured to both receive and provide input and output, respectively, including, for example, a touchscreen, a universal serial bus (USB) port, and so forth.

Memory 126 may include any technically feasible storage medium configured to store data and software applications. Memory 126 could be, for example, a hard disk, a random access memory (RAM) module, or a read-only memory (ROM), among others. Memory 126 includes a control application 128 and a database 130. Control application 128 is a software application that, when executed by processor 122, adjusts the dynamics of robot 110 in response to user 140 occupying an operating zone associated with robot 110. The operating zone of robot 110 is shown in FIG. 2.

Figure 2:
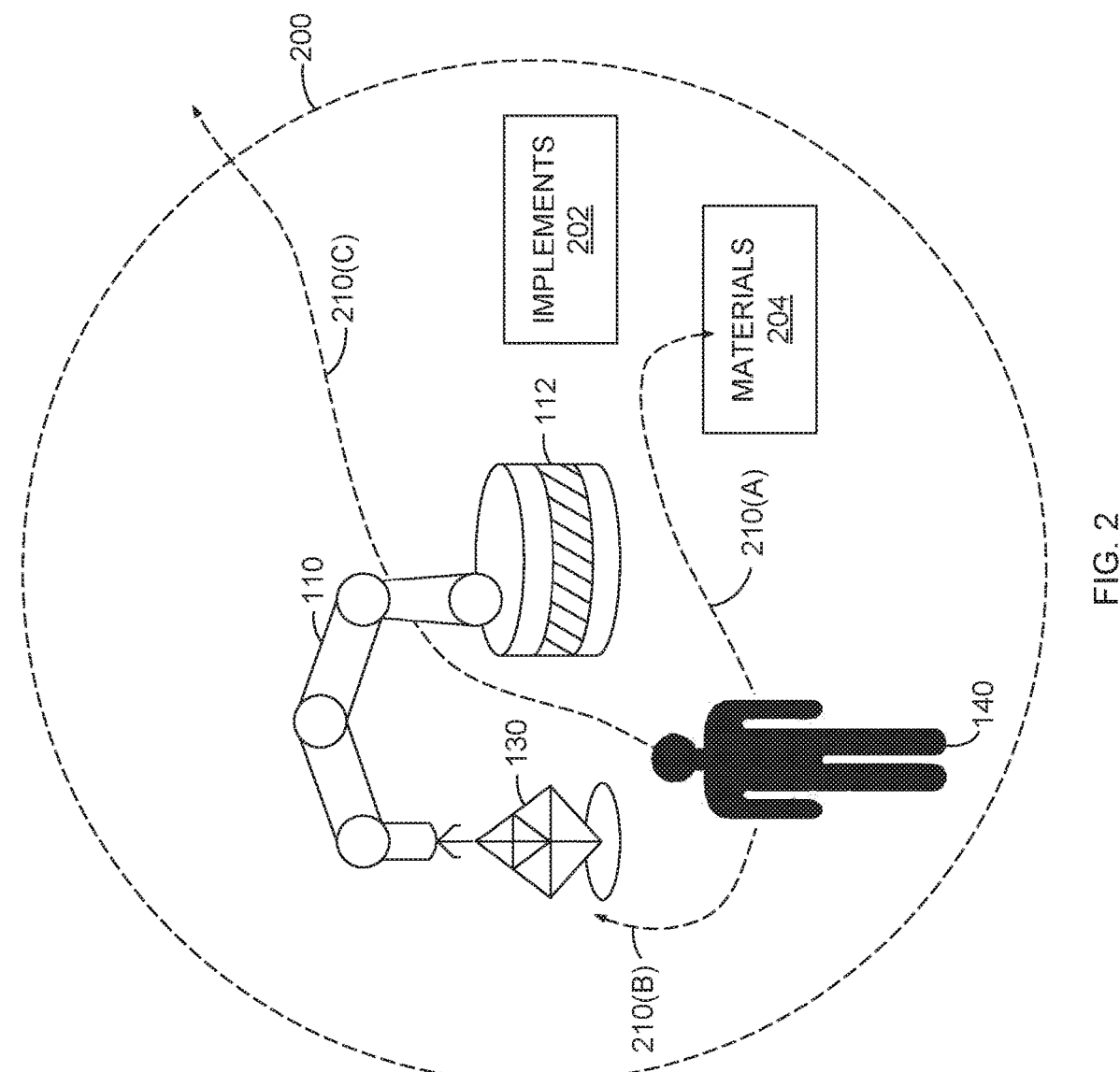
FIG. 2 illustrates an operating zone surrounding the robot of FIG. 1 that is transected by different paths associated with a user, according to various embodiments of the present invention.

FIG. 2 illustrates an operating zone surrounding the robot of FIG. 1 that is transected by different paths associated with a user, according to various embodiments of the present invention. As shown, operating zone 200 surrounds robot 110. Operating zone 200 may reflect the mechanical limits of robot 110 or a specific area within which robot 110 is programmed to operate. Operating zone 200 also includes various fabrication elements robot 110 may use when fabricating structure 130, including implements 202 and materials 204.

As also shown, user 140 traverses operating zone 200 along various pathways in order to perform different tasks. For example, user 140 could traverse path 210(A) to collect materials 204. Similarly, user 140 could traverse path 200 (B) to inspect structure 130. User 140 could also traverse path 200(C) to exit operating zone 200. Via sensor array 112, robot system 100 is configured to collect audiovisual data that represents the behavior of user 140. That behavior may include the traversal of paths 210, as discussed, as well as any other behavior performed by user 140. Based on that audiovisual data, control application 128 modifies the dynamics of robot 110 to accommodate the presence of user 140, thereby creating a safe environment within which user 140 can interact with robot 110. Control application 128 is discussed below in conjunction with FIG. 3.

Software Overview

Figure 3:
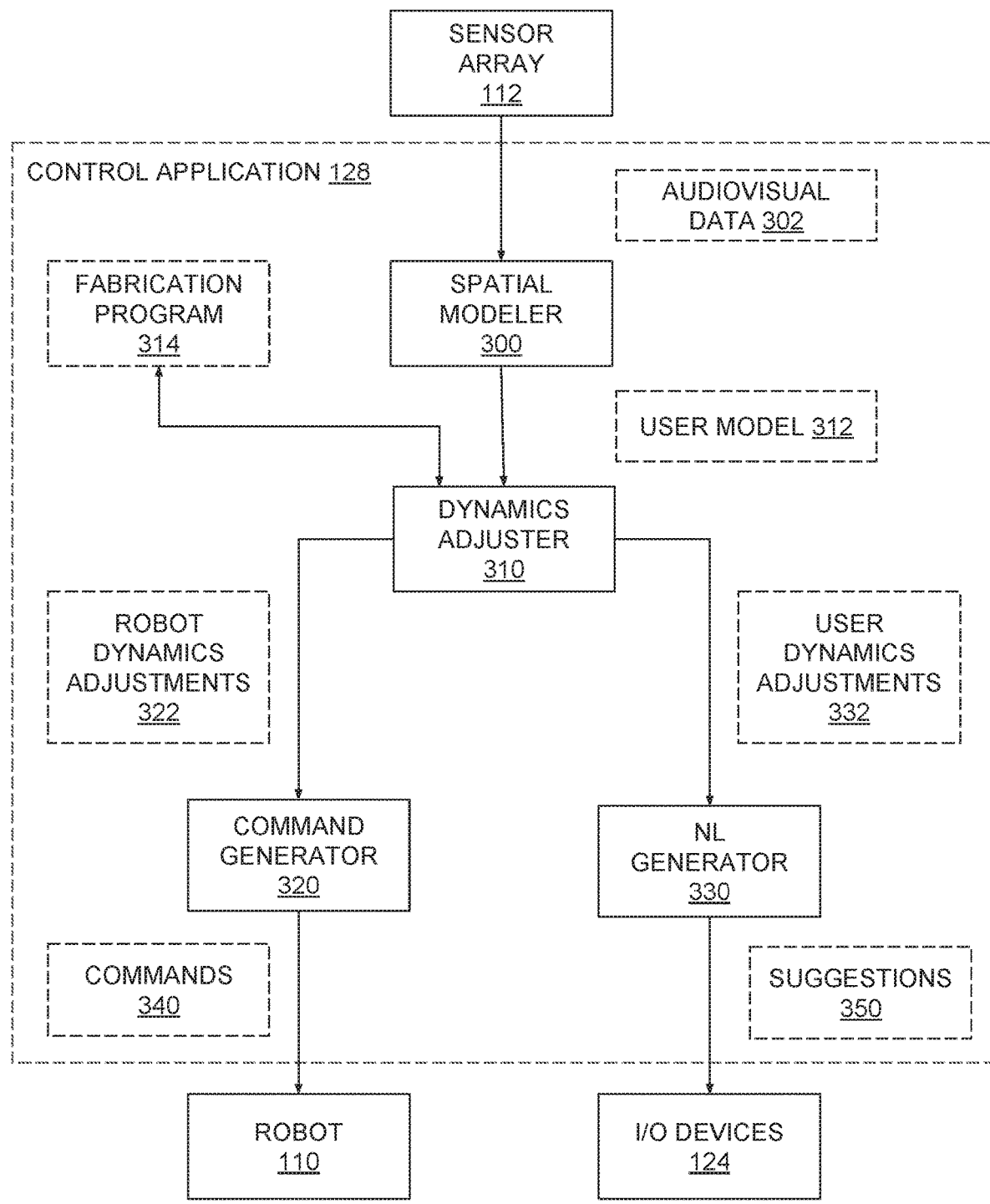
FIG. 3 illustrates in greater detail the control application of FIG. 1, according to various embodiments of the present invention.

FIG. 3 illustrates in greater detail the control application of FIG. 1, according to various embodiments of the present invention. As shown, control application 128 includes a spatial analyzer 300, a dynamics adjuster 310, a natural language (NL) generator 320, and a command generator 330.

Spatial analyzer 300 is a software module configured to model the dynamics of user 140 based on audiovisual data 302 to generate user model 312. In doing so, spatial analyzer 300 may implement computer vision techniques or other machine learning approaches. For example, spatial analyzer 300 could implement a spatial mapping approach to generate a point cloud representation of user 140 at a given time. Spatial analyzer 300 could repeat this process to identify cohesive portions of this point cloud that may correspond to the body, legs, arms, and so forth of user 140. Spatial analyzer 300 would then analyze and predict the motion of these cohesive portions. Alternatively, spatial analyzer 300 could model the dynamics of user 140 via motion capture techniques based on markers coupled to user 140. Spatial analyzer 300 transmits user model 312 to dynamics adjuster 310.

Dynamics adjuster 310 is a software module configured to adjust the dynamics of robot 110 based on the dynamics of user 140 set forth in user model 312. Dynamics adjuster 310 analyzes user model 312 to predict the position and configuration (or pose) of user 140 at various future times. Dynamics adjuster 310 also analyzes fabrication program 314 to determine the planned position and configuration of robot 110 at those future times.

Fabrication program 314 is a baseline program that establishes both high-level objectives for robot 110 to accomplish during fabrication of structure 130, and different sets of discrete tasks robot 110 may perform to achieve those objectives. In one embodiment, fabrication program 314 may include specific numerical control (NC) programs that robot 110 executes to perform such discrete tasks. In another embodiment, dynamics adjuster 310 determines the planned position and configuration of robot 110 by simulating the execution of fabrication program 314.

Based on user model 312 and fabrication program 314, dynamics adjuster 310 generates robot dynamics adjustments 322. Robot dynamics adjustments 322 include modifications to the current dynamics of robot 110 that cause robot 110 to accommodate the presence of user 140 at the aforesaid future times. Robot dynamics adjustments 322 could, for example, cause robot 110 to move more slowly as user 140 approaches robot 110. Alternatively, robot dynamics adjustments 322 could cause robot 110 to assume a different configuration in order to avoid a predicted collision with user 140 during operation. Robot dynamics adjustments 322 could also constrain robot to prevent the initiation of specific tasks that would be dangerous for user 140, such as arc welding in the presence of user 140.

In one embodiment, dynamics adjuster 310 extrapolates the dynamics of user 140 based on user model 312 to predict the position and configuration of user 140 at a specific time in the future. Dynamics adjuster 310, could for example, extrapolate the movements of cohesive groups of points associated with a point cloud representation of user 140, such as that discussed above. Then, dynamic adjuster 310 would determine a future position and configuration of user 140 at a future time. Dynamics adjuster 310 could also map this position and configuration to an identifiable action, such as "walking", "holding", and so forth. Dynamics adjuster 310 compares the predicted position and configuration (or action) of user 140 at the specific time to the planned configuration of robot 110 derived from fabrication program 314. Based on this comparison, dynamics adjuster 310 determines whether a collision, or near collision, could potentially occur between user 140 and robot 110 at the specific time. Dynamics adjuster 310 may perform this procedure for any range of future times to identify one or many potential collisions. Then, dynamics adjuster 310 generates robot dynamics adjustments 322 that cause robot 110 to avoid the predicted collision(s).

Command generator 320 receives robot dynamics adjustments 322 and then generates commands 340. Robot 110 executes commands 340 to implement modified dynamics that accommodate the predicted behavior of user 140. This approach may provide a safer working environment within which both robot 110 and user 140 can cooperate.

In addition to generating robot dynamics adjustments 322, dynamics adjuster 310 may also generate user dynamics adjustments 332 based on user model 312 and fabrication program 314. User dynamics adjustments 332 represent changes to the behavior of user 140 that may protect user 140 from danger or enhance cooperation between user 140 and robot 110. For example, user dynamics adjustments 332 could specify a position that would be objectively safer (e.g., would avoid collisions) for user 140 to occupy during a particular operation of robot 110. Alternatively, user dynamics adjustments 332 could indicate a particular action that user 140 could perform to optimize a fabrication task performed by robot 110 and user 140 cooperatively.

NL generator 330 processes user dynamics adjustments 332 and generates suggestions 350. Suggestions 350 include human language that can be communicated to user 140 and that describe user dynamics adjustments 332. I/O devices 124 output suggestions 350 as text or audio, among other forms of communication. User 140 may then perform the suggested actions.

Figure 4:
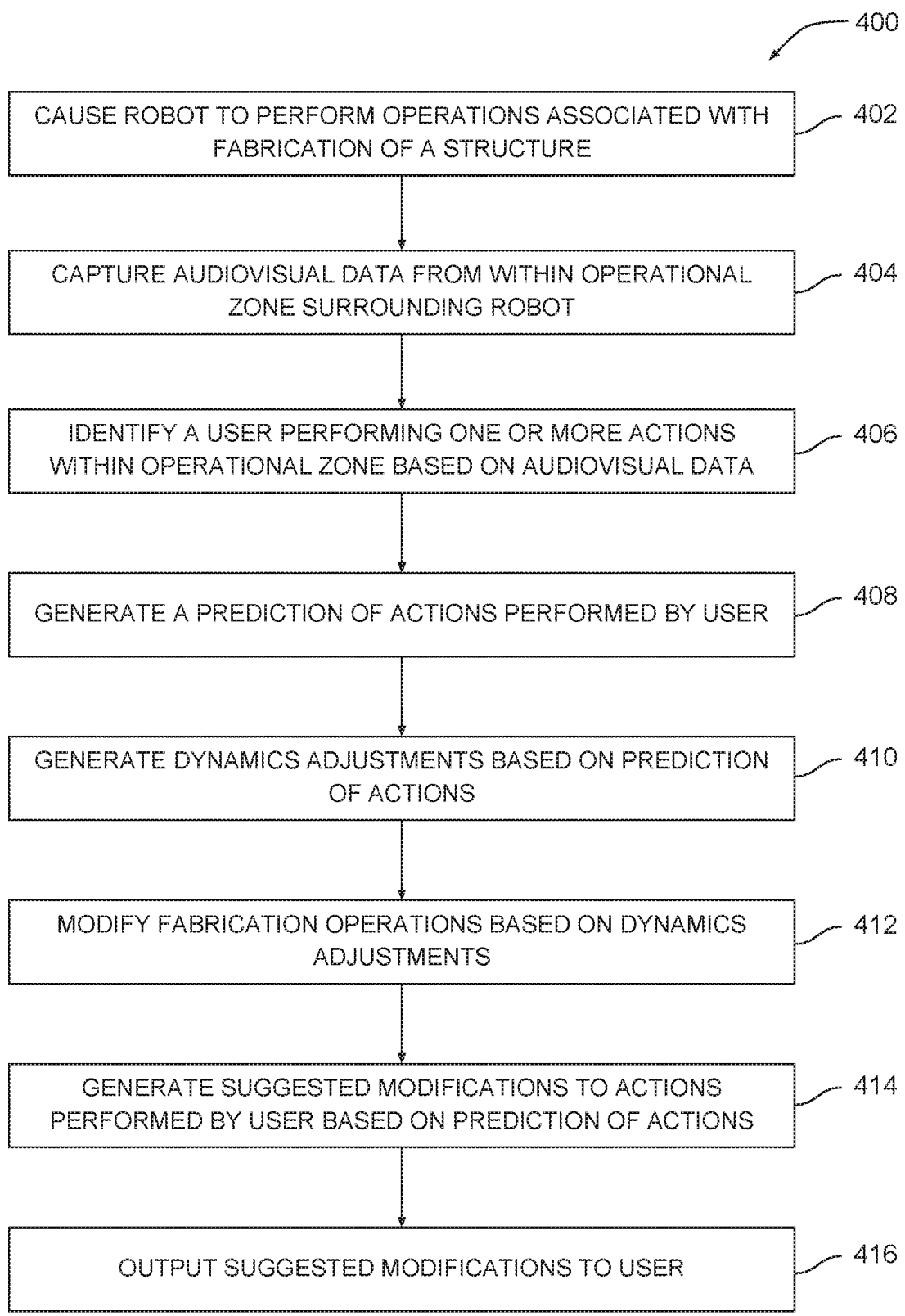
FIG. 4 is a flow diagram of method steps for modifying the dynamics of a robot in response to the presence of a user, according to various embodiments of the present invention.

Robot system 100 may implement the techniques discussed thus far to promote user safety within operating zone 200. Robot system 100 may also implement these techniques to promote cooperation with user 140. FIG. 4 describes these techniques in a procedural manner, and FIGS. 5A-8B described various examples of how robot 110 and user 140 safely co-occupy operating zone 200.

FIG. 4 is a flow diagram of method steps for modifying the dynamics of a robot in response to the presence of a user, according to various embodiments of the present invention. Although the method steps are described with respect to the systems of FIGS. 1-3, persons skilled in the art will understand that any system configured to perform the method steps, in any order, falls within the scope of the present disclosure.

As shown, a method 400 begins at step 402, where control application 128 causes robot to perform operations associated with fabrication of structure 130. Control application 128 could, for example, execute fabrication program 314. At step 404, control application 128 captures audiovisual data 302 from within operating zone 200 surrounding robot 110. At step 406, control application 128 identifies user 140 performing one or more actions within operating zone 200 based on audiovisual data 302.

At step 408, control application 128 generates a prediction of actions performed by user 140. Control application 128 could generate this prediction based on user model 312. At step 410, control application 128 generates robot dynamics adjustments 322 based on the predicted actions of user 140. Robot dynamics adjustments 322 generally cause robot 110 to accommodate the presence of user 140 and/or cooperate directly with user 140 when implemented. At step 412, control application 128 modifies fabrication operations performed by robot 110 based on robot dynamics adjustments 322 generated at step 412.

In addition, at step 414, control application 128 generates suggested modifications to the actions performed by user 140 based on the prediction of those actions generated at step 408. At step 416, control application 128 outputs these suggested modifications to user 140. Steps 414 and 416 may enhance interactions between robot 110 and user 140, and potentially allow those interactions to evolve over time. For example, as robot 110 provides suggestions to user 140, user 140 may in turn conceptualize improvements to the fabrication process performed by robot 110, and could then implement those improvements. In response, robot 110 could identify additional adjustments user 140 could make, and provide corresponding suggestions.

In this manner, control application 128 may preserve the safety of user 140 while also allowing robot 110 to continue fabrication operations. Further, control application 128 facilitates safe collaboration between user 140 and robot 110. The general techniques described thus far are also discussed below in conjunction with various examples shown in FIGS. 5A-8B.

Exemplary Interactions Between Robot and User

Figure 5A:
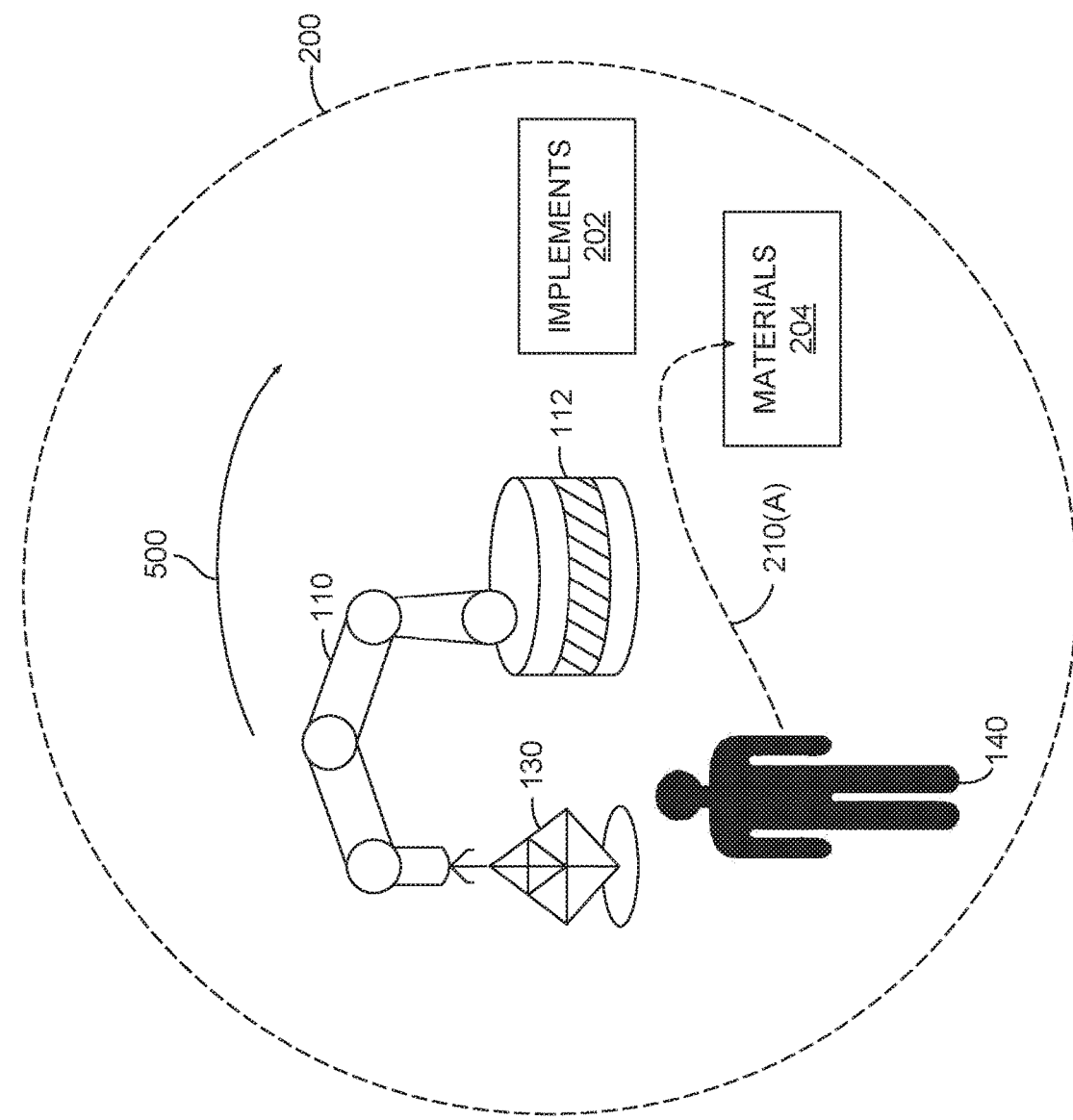
FIGS. 5A-5B illustrate how the control application of FIG. 1 adjusts the dynamics of the robot of FIG. 1 in response to the presence of a user, according to various embodiments of the present invention.
Figure 5B:
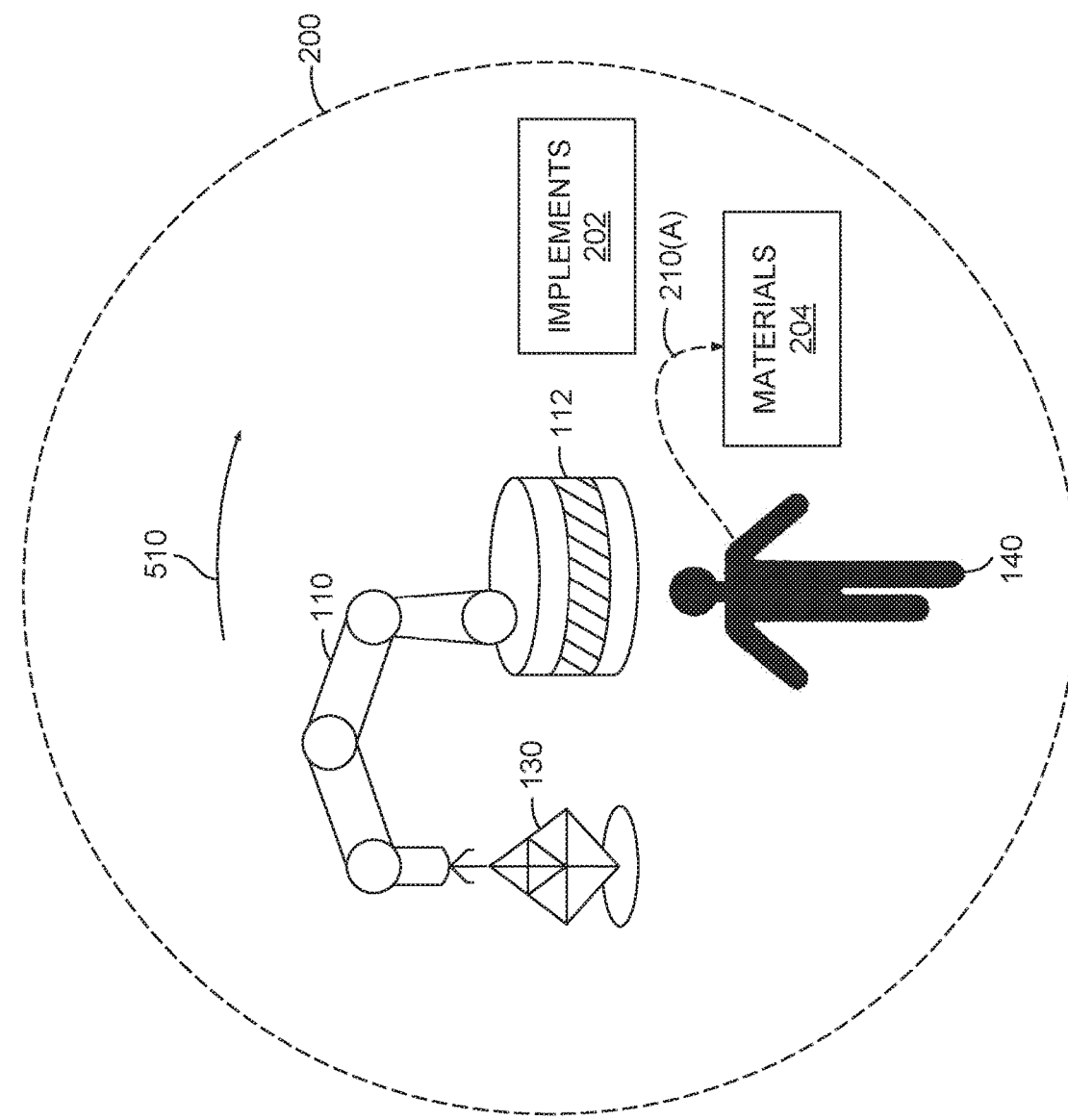

FIGS. 5A-5B illustrate how the control application of FIG. 1 adjusts the dynamics of the robot of FIG. 1 in response to the presence of a user, according to various embodiments of the present invention.

As shown in FIG. 5A, user 140 traverses path 210(A) towards materials 204 while robot 110 performs a fabrication maneuver 500. Fabrication maneuver 500 involves rotating robot 110 at a high rotation rate. Under ordinary circumstances, this maneuver may be dangerous to user 140. However, control application 128 is configured to mitigate that danger, as discussed below.

As shown in FIG. 5B, control application 128 causes robot 110 to slow down and perform fabrication maneuver 510 instead of fabrication maneuver 500. Control application 128 implements fabrication maneuver 510 in response to the presence and/or predicted behavior of user 140. In particular, control application 128 gathers audiovisual data 302 and then models the dynamics of user 140, thereby predicting that user 140 will traverse path 210(A). Since path 210(A) approaches robot 110, control application 128 adjusts the dynamics of robot 110 accordingly.

Because fabrication maneuver 510 is slower than fabrication maneuver 500, user 140 may have sufficient time to predict the motions of robot 110 and potentially avoid danger. In one embodiment, control application 128 reduces the speed of rotation associated with robot 110 in proportion to the distance between robot 110 and user 140. Control application 128 may also reconfigure robot 110 based on the position and/or configuration/pose of user 140, as described in greater detail below in conjunction with FIGS. 6A-6B.

Figure 6A:
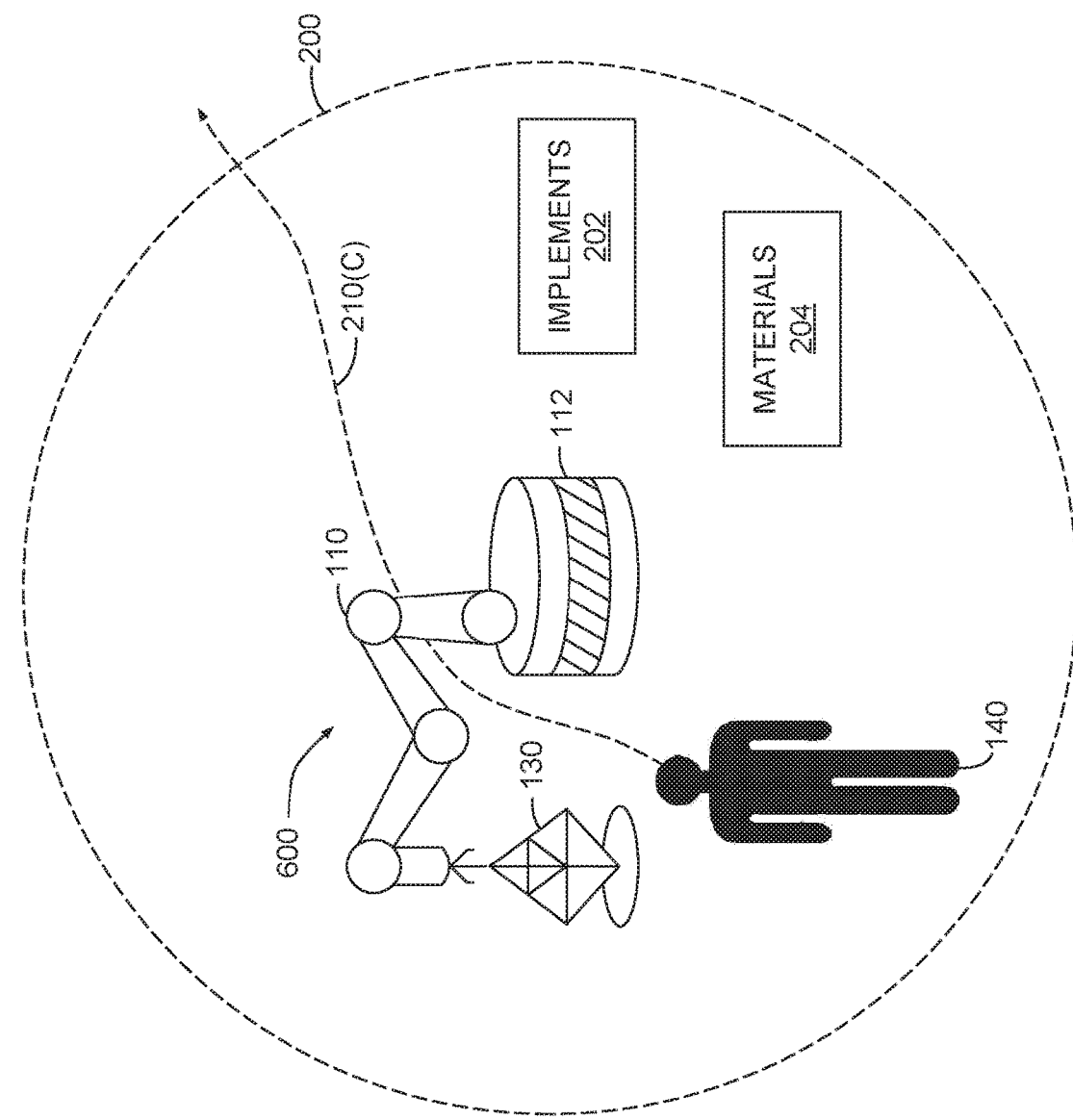

FIGS. 6A-6B illustrate how the control application of FIG. 1 adjusts the configuration of the robot of FIG. 1 in response to the presence of a user, according to various embodiments of the present invention.

As shown in FIG. 6A, user 140 traverses path 510(C) close to where robot 110 performs fabrication operations to fabricate structure 130. Control application 128 configures robot 110 according to configuration 600. Configuration 600 includes a specific set of joint angles according to which robot 110 is articulated. In configuration 600, robot 110 may block user 140 as user 140 traverses path 210(C), which may be dangerous to user 140 in a conventional setting. However, control application 128 is configured to mitigate this danger, as described below in conjunction with FIG. 6B.

As shown in FIG. 6B, control application 128 causes robot 110 to assume configuration 610, thereby accommodating the presence of user 140 as user 140 traverses path 210(C). Control application 128 gathers audiovisual data 302 and models the dynamics of user 140, then predicts that user 140 may collide with robot 110 when traversing path 210(C). In response, control application 128 adjusts the configuration of robot 110 to permit user 140 to safely pass under robot 110 and traverse path 210(C).

In various embodiments, control application 128 implements a genetic algorithm to determine one or more possible configurations for robot 110 that do not result in a collision with user 140. Then, control application 128 causes robot 110 to assume one such configuration. Control application 128 may also cause robot 110 to continue fabrication of structure 130 once reconfigured. With this approach, user 140 may safely occupy operating zone 200 while robot 110 fabricates structure 130. Control application 128 may also constrain the dynamics of robot 110 relative to the presence and/or predicted behavior of user 140, as described in greater detail below in conjunction with FIGS. 7A-7B.

Figure 7A:
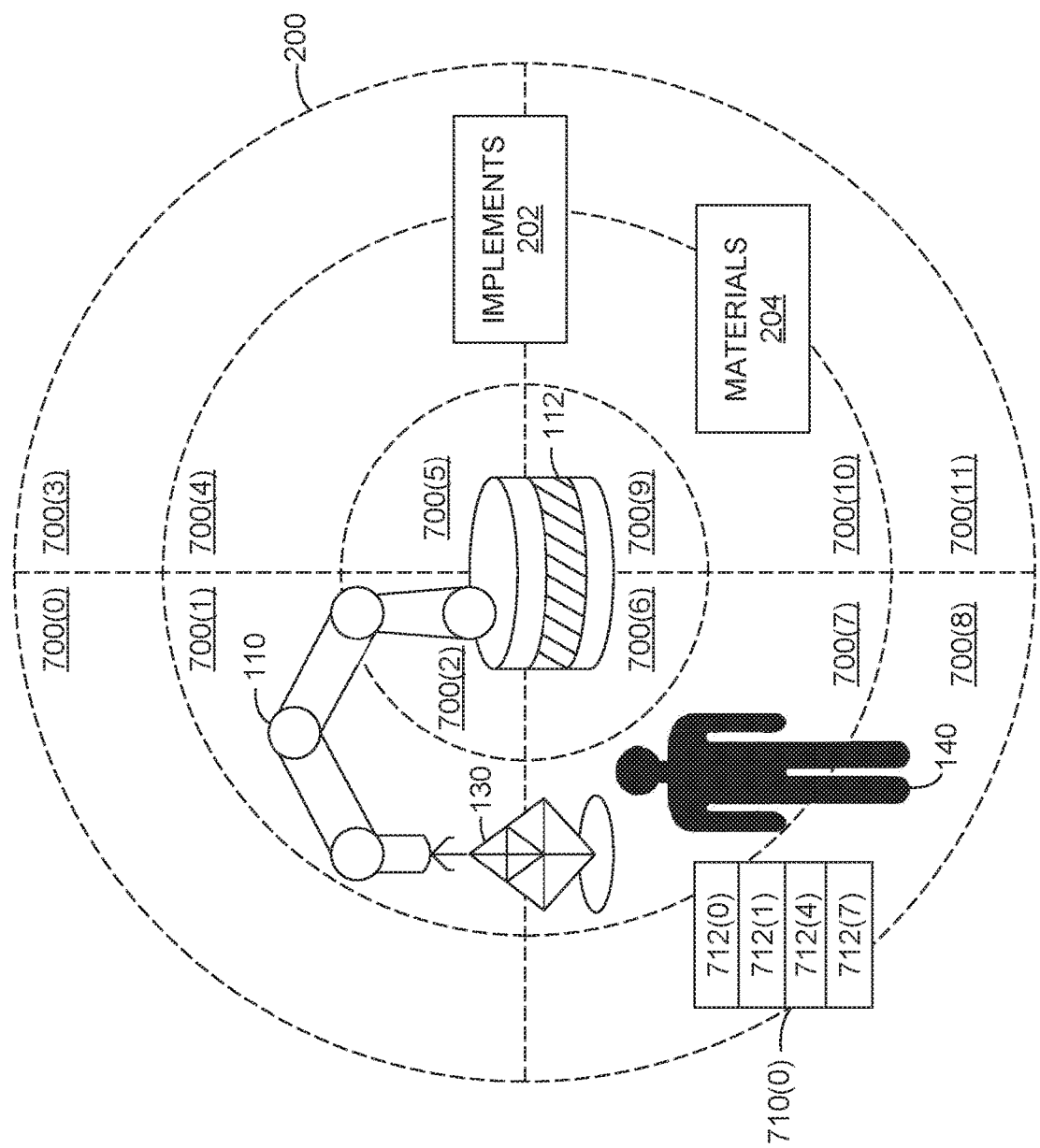
FIGS. 7A-7B illustrate how the control application of FIG. 1 constrains the dynamics of the robot of FIG. 1 based on the location of a user, according to various embodiments of the present invention.
Figure 7B:
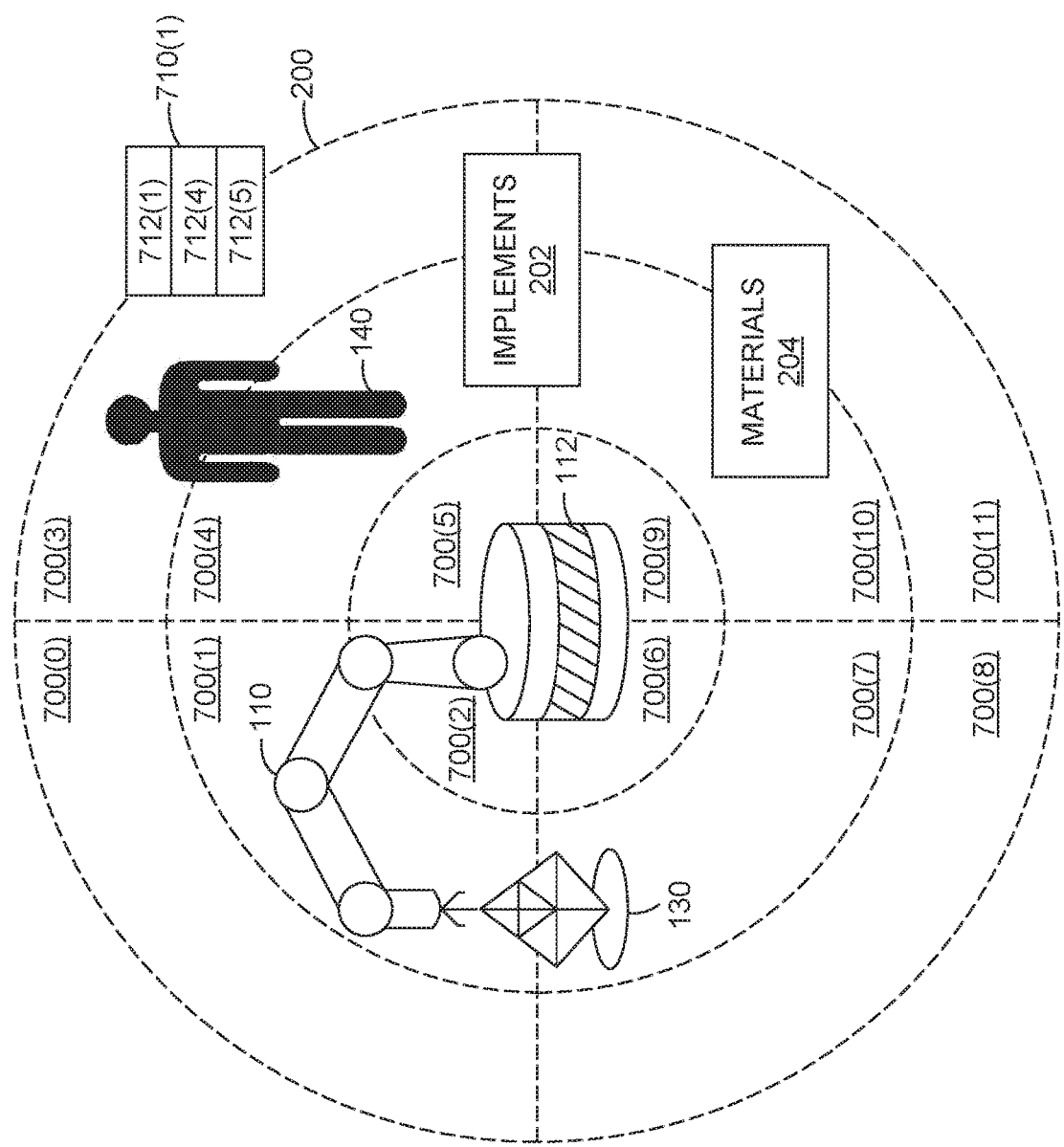

FIGS. 7A-7B illustrate how the control application of FIG. 1 constrains the dynamics of the robot of FIG. 1 based on the location of a user, according to various embodiments of the present invention. As shown in FIGS. 7A-7B, operating zone 200 is divided into subzones 700(0) through 700(11). User 140 may occupy any of subzones 700. Based on the particular subzone 700 user 140 occupies, control application 128 generates a specific set of dynamic operations available to robot 110.

For example, as shown in FIG. 7A, when user 140 occupies subzone 700(8), control application 128 generates set 710(0) of dynamics operations. Set 710(0) includes operations 712(0), 712(1), 712(4), and 712(7). In another example, as shown in FIG. 7B, when user 140 occupies subzone 700(4), control application 128 generates set 710(1) of dynamics operations. Set 710(1) includes operations 712(1), 712(4), and 712(5).

Control application 128 determines which dynamics operations 712 should be allowed when user 140 occupies a given subzone 700 based on whether those operations could potentially cause harm to user 140. Specifically, control application 128 determines which operations may endanger user 140 (deemed "unsafe" operations) and which operations may not (deemed "safe" operations). Control application 128 then includes the "safe" operations in the set 710 associated with the given subzone 700 and does not include the "unsafe" operations. In one embodiment, control application 128 is configured to recognize "dangerous" or "unsafe" operations, which could include, for example, collisions between robot 110 and user 140, among others. In another embodiment, control application 128 may also identify specific combinations of operations that may endanger user 140, and prevents all such operations from being included together in a given set 710. In yet another embodiment, control application 128 performs the above approach based on a prediction of the subzone 700 user 140 may occupy in the future.

Referring generally to FIGS. 5A-7B, the various techniques discussed by way of example thus far are generally meant to preserve the safety of user 140 when user 140 occupies operating zone 200. In addition, however, control application 128 may perform certain operations that facilitate interaction between user 140 and robot 110, as described below in conjunction with FIGS. 8A-8B.

Figure 8A:
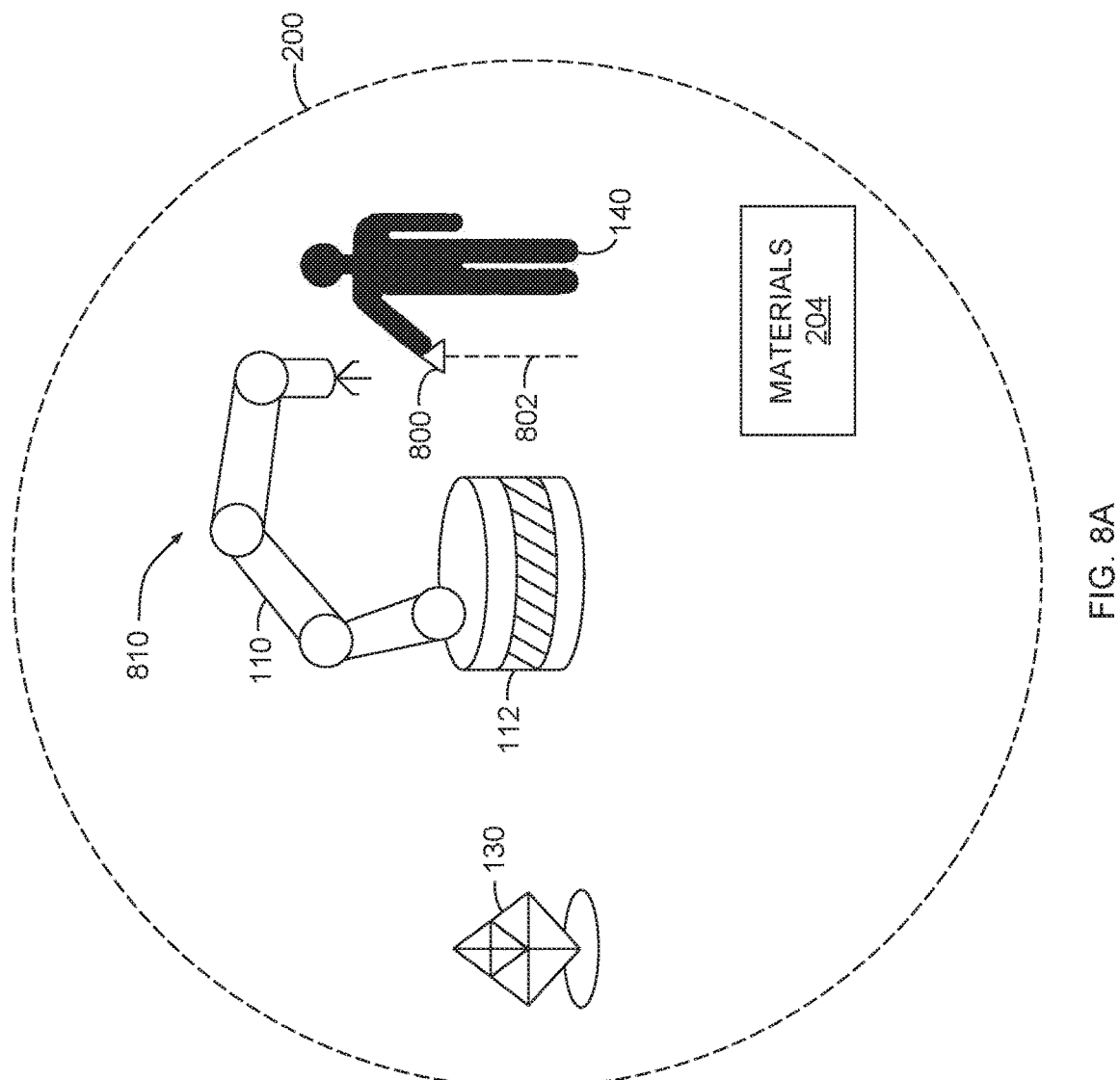
FIG. 8A-8B illustrate how the robot system of FIG. 1 interacts with a user to optimize a fabrication process, according to various embodiments of the present invention.
Figure 8B:
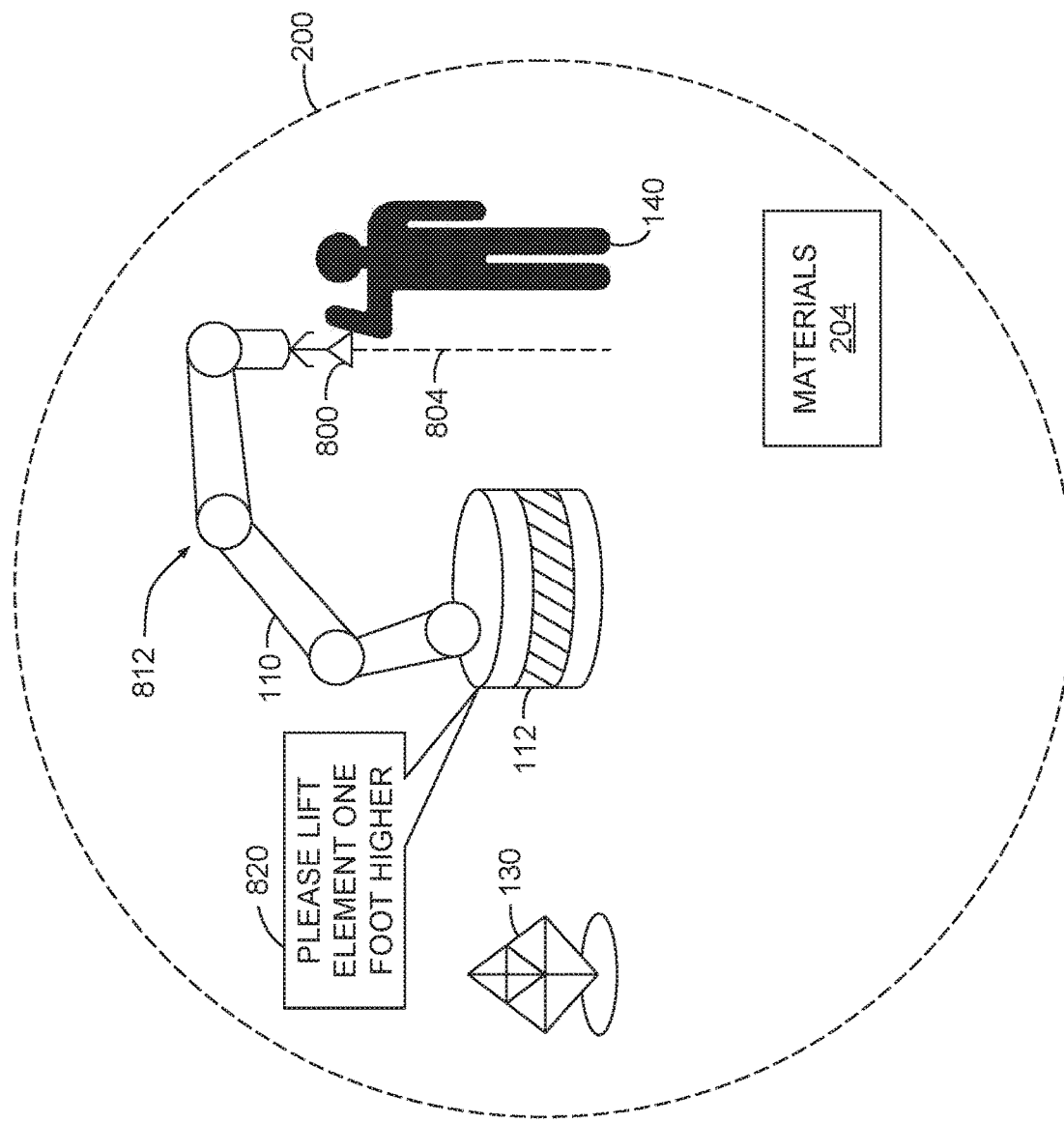

FIGS. 8A-8B illustrate how the robot of FIG. 1 interacts with a user to optimize a fabrication process, according to various embodiments of the present invention.

As shown in FIG. 8A, user 140 stands proximate to robot 110 and holds a structural element 800 at a height 802. Structural element 800 can be used to fabricate structure 130. User 140 attempts to provide structural element 800 to robot 110 to aid in the fabrication process. However, robot 110 occupies configuration 810 and cannot reach structural element 800. Control application 128 recognizes that fabrication is impeded because robot 110 cannot acquire structural element 800. In response, control application 128 determines specific dynamics for user 140 to implement that may facilitate fabrication.

Specifically, as shown in FIG. 8B, control application 128 generates suggestion 820 indicating that user 140 should raise structural element 800 one foot higher to height 804. Thus positioned, robot 110 may assume configuration 812 and obtain structural element 800 from user 140. In this manner, control application 128 allows robot 110 and user 140 to cooperate to perform fabrication tasks. Persons skilled in the art will understand that control application 128 may generate suggestions associated with any technically feasible fabrication task, and may also generate suggestions meant to preserve the safety of user 140. For example, control application 128 could instruct user 140 to move to a specific subzone 700 to avoid a dangerous fabrication operation.

Control application 128 implements any of the techniques described thus far, and any combination thereof, to control robot 110 when user 140 occupies operating zone 200. These techniques promote the safety of user 140 and also permit robot-human collaboration.

In sum, a robot system models the behavior of a user when the user occupies an operating zone associated with a robot. The robot system predicts future behaviors of the user, and then determines whether those predicted behaviors interfere with anticipated behaviors of the robot. When such interference potentially occurs, the robot system generates dynamics adjustments that can be implemented by the robot to avoid such interference. The robot system may also generate dynamics adjustments that can be implemented by the user to avoid such interference.

At least one advantage of the techniques described herein is that the user may occupy the operating zone associated with the robot with reduced risk. Further, the user can perform a variety of actions, and the robot adaptively adjusts dynamics to accommodate those actions. In addition, the user and robot may interact with one another in a more effective manner, thereby improving a fabrication processes that involve both humans and robots.

1. Some embodiments of the invention include a computer-implemented method for controlling a robot, the method comprising: capturing sensor data related to an operating zone within which the robot performs a fabrication process, generating a dynamic model associated with a user who is residing within the operating zone, predicting a first user action associated with the user based on the dynamic model, and adjusting one or more dynamics of the robot based on the first user action.

2. The computer-implemented method of clause 1, wherein the sensor data comprises a point cloud representation of the operating zone, and generating the dynamic model comprises analyzing the point cloud representation to identify one or more sets of points that move together over time.

3. The computer-implemented method of any of clauses 1 and 2, wherein predicting the first user action comprises: determining a first movement associated with the one or more sets of points, and mapping the first movement to the first user action.

4. The computer-implemented method of any of clauses 1, 2, and 3, wherein predicting the first user action comprises predicting a first time at which the first user action will occur.

5. The computer-implemented method of any of clauses 1, 2, 3, and 4, wherein adjusting one or more dynamics of the robot comprises: analyzing a fabrication program to identify a first robot action that is programmed to occur at the first time, identifying a conflict between the first user action and the first robot action, causing the robot to perform a second robot action at the first time instead of the first robot action to avoid the conflict.

6. The computer-implemented method of any of clauses 1, 2, 3, 4, and 5, wherein identifying the conflict comprises determining that the robot will collide with the user at the first time when the robot performs the first robot action and the user performs the first user action.

7. The computer-implemented method of any of clauses 1, 2, 3, 4, 5, and 6, wherein adjusting one or more dynamics of the robot comprises causing the robot to reduce at least one speed associated with a fabrication process.

8. The computer-implemented method of any of clauses 1, 2, 3, 4, 5, 6, and 7, wherein adjusting one or more dynamics of the robot comprises causing the robot to reorient at least one joint when performing a fabrication process.

9. The computer-implemented method of any of clauses 1, 2, 3, 4, 5, 6, 7, and 8, further comprising: processing the sensor data to identify a first subzone within the operating zone, and generating a set of dynamics operations corresponding to the first subzone, wherein the robot is able to perform any dynamics operation included in the set of dynamics operations so long as the user resides within the first subzone.

10. Some embodiments of the invention include a non-transitory computer-readable medium storing program instructions that, when executed by a processor, cause the processor to control a robot by performing the steps of: capturing sensor data related to an operating zone within which the robot performs a fabrication process, generating a dynamic model associated with a user who is residing within the operating zone, predicting a first user action associated with the user based on the dynamic model, and adjusting one or more dynamics of the robot based on the first user action.

11. The non-transitory computer-readable of clause 10, wherein the sensor data comprises a point cloud representation of the operating zone, and the step of generating the dynamic model comprises analyzing the point cloud representation to identify one or more sets of points that move together over time.

12. The non-transitory computer-readable medium of any of clauses 10 and 11, wherein the step of predicting the first user action comprises: determining a first movement associated with the one or more sets of points, and mapping the first movement to the first user action.

13. The non-transitory computer-readable of any of clauses 10, 11, and 12, wherein the step of predicting the first user action comprises predicting a first time at which the first user action will occur, and wherein the step of adjusting one or more dynamics of the robot comprises: analyzing a fabrication program to identify a first robot action that is programmed to occur at the first time, identifying a conflict between the first user action and the first robot action, causing the robot to perform a second robot action at the first time instead of the first robot action to avoid the conflict.

14. The non-transitory computer-readable of any of clauses 10, 11, 12, and 13, wherein identifying the conflict comprises determining that the robot will collide with the user at the first time when the robot performs the first robot action and the user performs the first user action.

15. The non-transitory computer-readable of any of clauses 10, 11, 12, 13, and 14, further comprising the steps of: processing the sensor data to identify a first subzone within the operating zone, generating a set of dynamics operations corresponding to the first subzone, wherein the robot is able to perform any dynamics operation included in the set of dynamics operations so long as the user resides within the first subzone.

16. The non-transitory computer-readable of any of clauses 10, 11, 12, 13, 14, and 15, wherein the robot is not able to perform any dynamics operations other than the dynamics operations included in the set of dynamics operations while the user resides within the first subzone.

17. The non-transitory computer-readable of any of clauses 10, 11, 12, 13, 14, 15, and 16, further comprising the steps of: analyzing a fabrication program to identify a first robot action that is to occur at a later time, determining a second user action that facilitates the first robot action, indicating the second user action to the user.

18. The non-transitory computer-readable of any of clauses 10, 11, 12, 13, 14, 15, 16, and 17, wherein the step of indicating the second user action to the user comprises: generating a natural language description of the second user action, and outputting the natural language description to the user.

19. Some embodiments of the invention include a system, comprising: a robot that performs a fabrication process within an operating zone, a sensor array that captures sensor data related to the operating zone, a memory storing a control application, and a processor that executes the control application to perform the steps of: generating a dynamic model associated with a user who is residing within the operating zone, predicting a first user action associated with the user based on the dynamic model, and adjusting one or more dynamics of the robot based on the first user action.

20. The system of clause 1, wherein the robot comprises a jointed arm, and wherein the processor adjusts the one or more dynamics of the robot by modifying at least one joint angle associated with the robot.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for controlling a robot, the method comprising:
   capturing sensor data related to an operating zone within which the robot performs a fabrication process;
   generating a dynamic model associated with a user who is residing within the operating zone;
   predicting, based on the dynamic model, a predicted user action that the user is to perform at a first later time;
   generating, based on the predicted user action, a set of dynamics adjustments of the robot for performing a first robot action in the fabrication process;
   determining, based on the predicted user action, a suggested user action in the operating zone that facilitates the first robot action; and
   generating a first suggestion indicating the suggested user action, wherein an output device provides the first suggestion to the user.

2. The computer-implemented method of claim 1, wherein the sensor data comprises a point cloud representation of the operating zone, and generating the dynamic model comprises analyzing the point cloud representation to identify one or more sets of points that move together over time.

3. The computer-implemented method of claim 2, wherein predicting the predicted user action comprises:
   determining a first movement associated with the one or more sets of points; and
   mapping the first movement to the predicted user action.

4. The computer-implemented method of claim 1, wherein predicting the predicted user action comprises determining the first later time at which the predicted user action will occur.

5. The computer-implemented method of claim 4, wherein generating the set of dynamics adjustments comprises:
   analyzing a fabrication program to identify a first robot action that is programmed to occur at the first later time;
   identifying a conflict between the predicted user action and the first robot action;
   causing the robot to perform a second robot action at the first later time instead of the first robot action in order to avoid the conflict.

6. The computer-implemented method of claim 5, wherein identifying the conflict comprises determining that the robot will collide with the user at the first later time when the robot performs the first robot action and the user performs the predicted user action.

7. The computer-implemented method of claim 1, wherein generating the set of dynamics adjustments comprises causing the robot to reduce at least one speed associated with the fabrication process.

8. The computer-implemented method of claim 1, wherein generating the set of dynamics adjustments comprises causing the robot to reorient at least one joint when performing the fabrication process.

9. The computer-implemented method of claim 1, further comprising:
processing the sensor data to identify a first subzone within the operating zone; and
generating a set of dynamics operations corresponding to the first subzone,
wherein the robot is able to perform any dynamics operation included in the set of dynamics operations so long as the user resides within the first subzone.

10. One or more non-transitory computer-readable media storing program instructions that, when executed by one or more processors, cause the one or more processors to control a robot by performing the steps of:
capturing sensor data related to an operating zone within which the robot performs a fabrication process;
generating a dynamic model associated with a user who is residing within the operating zone;
predicting, based on the dynamic model, a predicted user action that the user is to perform at a first later time;
generating, based on the predicted user action, a set of dynamics adjustments of the robot for performing a first robot action in the fabrication process
determining, based on the predicted user action, a suggested user action in the operating zone that facilitates the first robot action; and
generating a first suggestion indicating the suggested user action, wherein an output device provides the first suggestion to the user.

11. The one or more non-transitory computer-readable media of claim 10, wherein the sensor data comprises a point cloud representation of the operating zone, and the step of generating the dynamic model comprises analyzing the point cloud representation to identify one or more sets of points that move together over time.

12. The one or more non-transitory computer-readable media of claim 11, wherein the step of predicting the predicted user action comprises:
determining a first movement associated with the one or more sets of points; and
mapping the first movement to the predicted user action.

13. The one or more non-transitory computer-readable media of claim 10, wherein:
the step of predicting the predicted user action comprises determining the first later time at which the predicted user action will occur, and
the step of generating the set of dynamics adjustments comprises:
analyzing a fabrication program to identify a first robot action that is programmed to occur at the first later time;
identifying a conflict between the predicted user action and the first robot action;
causing the robot to perform a second robot action at the first later time instead of the first robot action in order to avoid the conflict.

14. The one or more non-transitory computer-readable media of claim 13, wherein identifying the conflict comprises determining that the robot will collide with the user at the first later time when the robot performs the first robot action and the user performs the predicted user action.

15. The one or more non-transitory computer-readable media of claim 10, further comprising the steps of:
processing the sensor data to identify a first subzone within the operating zone; and
generating a set of dynamics operations corresponding to the first subzone,
wherein the robot is able to perform any dynamics operation included in the set of dynamics operations so long as the user resides within the first subzone.

16. The one or more non-transitory computer-readable media of claim 15, wherein the robot is not able to perform any dynamics operations other than the dynamics operations included in the set of dynamics operations while the user resides within the first subzone.

17. The one or more non-transitory computer-readable media of claim 10, wherein:
the step of generating the first suggestion indicating the suggested user action comprises generating a natural language description of the first suggestion; and
further comprising outputting, to the user, the natural language description the first suggestion.

18. A system, comprising:
a robot that performs a fabrication process within an operating zone;
a sensor array that captures sensor data related to the operating zone;
a memory storing a control application; and
a processor that executes the control application to perform the steps of:
generating a dynamic model associated with a user who is residing within the operating zone,
predicting, based on the dynamic model, a predicted user action that the user is to perform at a first time,
generating, based on the predicted user action, a set of dynamics adjustments of the robot for performing a first robot action in the fabrication process,
determining, based on the predicted user action, a suggested user action in the operating zone that facilitates the robot action, and
generating a first suggestion indicating the suggested user action, wherein an output device provides the first suggestion to the user.

19. The system of claim 18, wherein:
the robot comprises a jointed arm, and
the processor further executes the control application to generate the set of dynamics adjustments by modifying at least one joint angle associated with the robot.

20. The computer-implemented method of claim 1, wherein the set of dynamics adjustments are generated based on a predicted pose associated with the user.

21. The computer-implemented method of claim 1, wherein a fabrication program comprises numerical control programs that the robot executes for performing the fabrication process.

22. The computer-implemented method of claim 21, wherein generating the set of dynamics adjustments comprises analyzing the fabrication program to identify a planned position and configuration of the robot at the first later time.

* * * * *